US006356971B1

(12) United States Patent
Katz et al.

(10) Patent No.: US 6,356,971 B1
(45) Date of Patent: Mar. 12, 2002

(54) SYSTEM FOR MANAGING MULTIMEDIA DISCS, TRACKS AND FILES ON A STANDALONE COMPUTER

(75) Inventors: Norman P. Katz; Hiroyuki Shinkai, both of San Diego, CA (US); Junichi Nakamura, Funabashi (JP)

(73) Assignees: Sony Corporation, Tokyo (JP); Sony Electronics Inc., San Diego, CA (US)

( * ) Notice: Subject to any disclaimer, the term of this patent is extended or adjusted under 35 U.S.C. 154(b) by 0 days.

(21) Appl. No.: 09/262,943

(22) Filed: Mar. 4, 1999

(51) Int. Cl.[7] ............................................. G06F 13/00

(52) U.S. Cl. ........................... 710/301; 369/30; 369/33; 369/178

(58) Field of Search .................... 710/102, 103, 710/301, 302; 707/102, 103, 104, 100, 10, 1, 3, 7; 369/30, 34, 36, 41, 178, 190, 196, 1, 37, 33

(56) References Cited

U.S. PATENT DOCUMENTS

| 5,726,960 A | * | 3/1998 | Yoshida et al. | ................. 369/34 |
| 5,740,134 A | * | 4/1998 | Peterson | ........................ 369/30 |
| 5,813,014 A | | 9/1998 | Gustman | ..................... 707/103 |
| 5,832,499 A | | 11/1998 | Gustman | ..................... 707/103 |
| 5,845,104 A | | 12/1998 | Rao | ............................ 395/440 |
| 5,848,398 A | * | 12/1998 | Martin et al. | .................. 705/14 |
| 5,872,747 A | * | 2/1999 | Johnson | ........................ 369/30 |
| 5,959,945 A | * | 9/1999 | Kleiman | ....................... 369/30 |
| 6,247,022 B1 | * | 6/2000 | Yankowski | .................. 707/104 |

OTHER PUBLICATIONS

Voyetra, AudioStation for Windows 3.1. and 95, product brouchure (1996).

Voyetra, VideoStation 2 for Windows 3.1 and 95, product brochure (1997).

* cited by examiner

*Primary Examiner*—Ario Etienne
(74) *Attorney, Agent, or Firm*—Skjerven Morrill MacPherson LLP; Fabio E. Marino

(57) ABSTRACT

A computer system is provided that allows the content of a user's collection of fixed and removable media to be managed without regard to a specific type of media. The computer system performs equally well with files on floppy discs, removable hard-disks such as Iomega Zip, CDDA discs, CD-ROM discs, DVD-ROM discs and recordable or re-writeable variants of CD-ROMs and DVD-ROMs. The computer system of the present invention includes a computer program that allows a user to: insert his/her own collection of discs into a changer device and automatically inventory the changer to create a database or "cache" of the titles, directories and file names on all discs in the changer, describe and categorize both audio and CD-ROM discs, sort the discs based on different criteria, load a specific disc into the changer's drive to access files or play audio or video tracks, display discs and the multimedia files on the changer either textually or graphically, create playlists and collections of specific files or tracks as a reference for locating them later or incorporating them into presentations, use a built-in player to play a sequence of multimedia clips or tracks, while automatically loading CDs containing these clips and tracks as needed, view certain multimedia discs such as CD-Extra discs as both a set of audio tracks and a directory tree of files, maintain information associated with CDs in a database after the CDs are removed from the disc changer device, and allow the user to browse through his/her CD collection even after the discs have been removed from the disc changer device.

24 Claims, 7 Drawing Sheets

SYSTEM FOR MANAGING MULTIMEDIA DISCS, TRACKS AND FILES ON A STANDALONE COMPUTER

COPYRIGHTED MATERIALS

The present disclosure contains material which is subject to copyright protection. The copyright owner has no objection to the facsimile reproduction by anyone of the patent document or the present disclosure, as it appears in the Patent and Trademark Office patent files or records, but otherwise reserves all copyright rights whatsoever.

BACKGROUND OF THE INVENTION

1. Field of the Invention

The present invention relates generally to computer systems and, particularly to computer systems for managing data stored on a variety of peripheral devices.

2. Related Art

With the proliferation of digital multimedia systems, it is not uncommon for both home personal computer (PC) users and professionals to access and manage thousands of multimedia files or collections of tens of compact disc-digital audio (CDDA) discs or other removable multimedia discs containing digitized audio or video tracks from a desktop computer or workstation. Existing operating system components and commercial software applications do not provide an effective method for individuals to organize and browse through their personal collection of multimedia discs and files. For example, a graphic artist may own a collection of 25 CD-ROM discs, containing digital photos and other image files. If each disc contains 2,000 files, the artist is faced with searching for a file in a collection of 50,000 files. There currently exists no convenient way to organize and manage a large collection of files spread across multiple removable discs in the user's personal collection.

Existing software applications that attempt to address some of these problems are often known as content managers or "media asset managers." These applications often address specific types of files rather than providing a more generalized tool for all multimedia files, tracks, and discs.

Some existing applications manage digital images, by providing a tool to catalog and produce thumbnails of each image file on a disc or the set of "mounted" or "online" volumes on a computer. These applications allow users to input keywords describing each image and a method for searching for images based on these keywords. The thumbnails and descriptive text are stored in a database. Some applications also allow the database to contain links to digital audio and video clips as well.

Other software applications exist that allow the user to build a database of their music CD collection. Each of these applications contain a database component to store the album title, artist, publisher, track list, and in some cases, music category, jacket cover, and artist and publisher's web sites. In some cases, these applications connect to a database on the Internet whenever a new disc is mounted, that provides this information automatically so the user does not need to type it in manually. However, the inventors have not found an application that integrates the management of music CDs in conjunction with a changer to provide automatic inventory, loading, playlist construction, and multi-disc playback features described herein. The inventors have not found an application that can manage tens of music and video discs that can be played on a personal computer as well as standalone consumer electronics components such as CD music players or videodisc players. Furthermore, the inventors have not found an application that integrates the management of individual files on discs with the management of multiple CD-ROM titles such as music discs, CD-ROM games, or reference CDs. Lastly, the inventors have not found an application that is tightly-coupled with device drivers for CD-ROM changers, allowing a complete inventory of the discs in the changer, along with automatic insertion of titles, tracks, and directory and file names into respective databases contained within the application components.

Some software applications exist to manage CD-ROMs or other removable media in a jukebox device. These applications are typically designed for jukeboxes connected to a server, in which the media must be shared over a network. These applications have an inventory function that automatically mounts and reads the title information from each CD-ROM and creates a set of mount points or subdirectories under a common root directory to allow users on the network to mount specific titles or the entire set of discs to a locally-accessible mount point on the client workstation. These applications handle the automatic loading of a disc into an available drive in the jukebox whenever a user needs to access the specific disc. However, the inventors have not found an application that provides these general purpose jukebox functions along with a means for users to categorize, sort, and filter specific discs in a jukebox or changer based on criteria such as author, publisher, user-defined category. Neither have the inventors found an application that provides jukebox functions within an integrated application that allows the user to build, preview, and operate on collections of links or bookmarks to specific files or tracks spread across many of the discs within the jukebox.

SUMMARY OF THE INVENTION

The present invention addresses the needs of computer users and professionals that need to access and manage numerous multimedia files and/or collections of compact discs and other removable multimedia discs containing digitized audio or video tracks using a desktop computer or workstation.

The computer system of the present invention allows graphic artists, as well as professionals who use CD-ROMs containing reference data, such as medical records, legal proceedings or tax forms to manage their collections of CD-ROMs more efficiently and effectively.

The computer system of the present invention further allows the content of a user's collection of fixed and removable media to be managed without regard to a specific type of media. The computer system performs equally well with files on floppy discs, removable hard-disks such as Iomega Zip, CDDA discs, CD-ROM discs, DVD-ROM discs and recordable or re-writeable variants of CD-ROMs and DVD-ROMs. The computer system of the present invention includes a computer program that allows a user to: insert his/her own collection of discs into a changer device and automatically inventory the changer to create a database or "cache" of the titles, directories and file names on all discs in the changer, describe and categorize both audio and CD-ROM discs, sort the discs based on different criteria, load a specific disc into the changer's drive to access files or play audio or video tracks, display the multimedia files on the changer either textually or graphically, create playlists and collections of specific files or tracks as a reference for locating them later or incorporating them into presentations, view certain multimedia discs such as CD-Extra discs as both a set of audio tracks and a directory tree of files, maintain information associated with CDs in a database after the CDs are removed from the disc changer device, and allow the user to browse through his/her CD collection even after the discs have been removed from the disc changer device.

The computer program allows users to catalog, organize, and browse through their collections of discs, multimedia files and tracks in unique ways. The computer program includes device drivers and interfaces to peripherals known as "changers" or "jukeboxes" that contain multiple removable discs and allow automatic loading of discs into a drive in the disc changer device upon either user-initiated or program-initiated commands. The computer program further supports "carousel" disc changer devices that allow the user to insert several discs at once into the disc changer device when the device's door is open. The computer program detects differences in the disc changer device's inventory when the door is closed and allows the user to automatically inventory all newly detected discs. The computer program also detects which slots in the disc changer device are empty and removes the slot entries and directory trees for respective CD-ROMs from the program's cache, but maintains certain information about the CD in a persistent database. The computer program includes a database component that persistently reflects the user's collection of removable media even when the removable discs are not mounted or installed on a peripheral device of the computer system. Information about each disc that is stored persistently includes the disc's title, author, publisher, and category, and, in the case of audio CDs, the CD's track list, including track names and times, and jacket cover image.

The computer program allows the user to create both playlists and collections of specific multimedia files or tracks the user is interested in or is working with. The ordering of files or tracks in the playlists can be changed to suit the user's desired order when performing playback of the data using either a built-in player described in the architecture, or an external player or presentation tool that is aware of the format of the playlist or collection. The operations of cataloging, organizing, browsing and creating collections are all contained in a single integrated application framework designed to enhance the user's ability to find information within a potentially massive collection of multimedia content.

Furthermore, the computer system of the present invention allows links or bookmarks within collections to be displayed and browsed visually as thumbnails and used to automatically load discs containing files referred to by respective links whenever the files associated with these links need to be accessed.

DETAILED DESCRIPTION OF THE INVENTION

Figure 1:
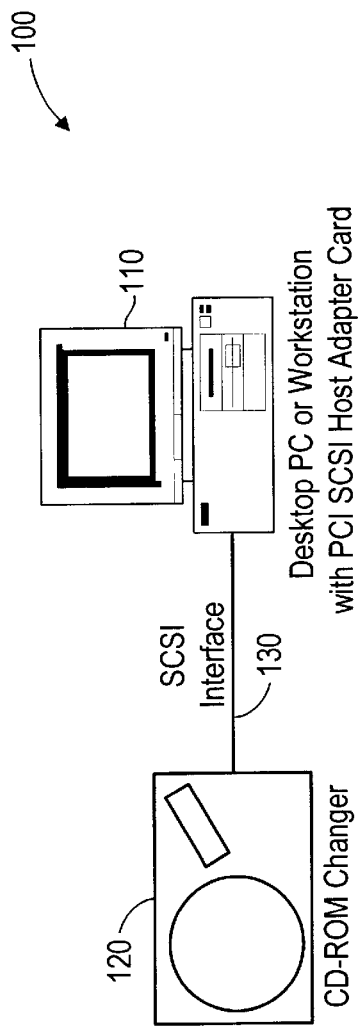
FIG. 1 is a block diagram of a computer system in accordance to an embodiment of the invention.

FIG. 1 is a block diagram of a computer system 100, in accordance to an embodiment of the invention. Computer system 100 includes a computer 110 connected to a disc changer device 120 via a high-speed interface 130. In some embodiments, computer 100 is any personal computer (PC) such as an Intel Pentium-based computer, available from a variety of third parties, or a Macintosh computer, available from Apple Computer Inc. of Cupertino, Calif., or a workstation such as an UltraSparc workstation, available from Sun Microsystems, Inc. of Mountain View, Calif. Disc changer device 120 is any CD-ROM changer device such as CD-ROM changer CDJ-C50S, available from Sony Electronics, Inc. of Park Ridge, N.J., a DVD disc drive, a hard-disk drive or any other random-access mass-storage device known in the art. The media used disc changer device 120 includes at least CD-ROMs, CD-Recordable (CDR) discs, and CD-Rewritable (CDRW) discs. Network interface 130 is a Small Computer System Interface (SCSI), or any other network interface known in the art to enable a computer to communicate to a peripheral device at sufficient speed to allow data to be streamed from the media to computer 110 at the required rate to display or process the data without drop-out.

Figure 2:
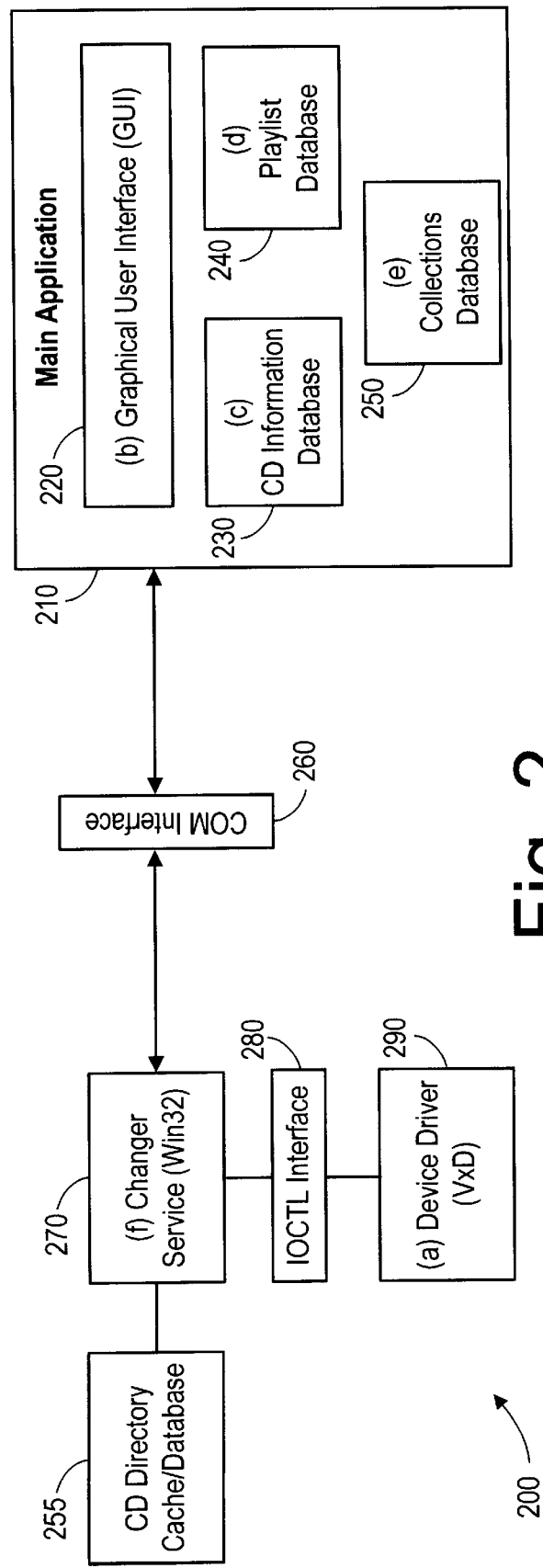
FIG. 2 is a functional block diagram of the software components of the computer system of FIG. 1.

FIG. 2 is a functional block diagram of a computer program 200 executed by computer system 100, in accordance to an embodiment of the invention.

Computer system 100 is designed to optimize the efficiency with which a user would organize, manage, and search through a collection of music CDs and CD-ROMs and the content found therein. These features are especially useful for graphic artists that work with digital images, semi-professional recording artists, and consumers looking for total control of their CD music collections.

Computer program 200 includes an application program 210 executed by computer 110, a Component Object Model (COM) interface 260, a changer service 270, an IOCTL interface 280 and a device driver 290 used to control disc changer device 120. Changer service 270, in turn, includes a CD directory database 255 with integrated directory caching mechanism for storing CD directory trees and track lists.

Application program 210, includes a GUI 220 with built-in player for CDDA and digital multimedia clips, a CD Information database 230, a playlist database 240 to store user-defined playlists and a collections database 250 to store user-defined collections or bookmarks with graphic and text descriptors. Device driver 290 controls the movement of the robotics in disc changer device 120 used to position the carousel or picker to a drive or a door. Device driver 290 also reads the status of the drive(s), the door, and the slot list, as reported by the device firmware. Device driver 290 checks the slot list reported by the device firmware against an internal database and reports inconsistencies to application program 210, via an application programmer's interface (API) or directly to the user, via a dialog box. Device driver 290 uses this information to automatically update CD Directory database 255, eliminating entries for empty slots and adding entries for newly-occupied slots, whenever the device senses that the door is closed. Device driver 290 supports one or more disc changer devices 120 connected to computer 110 through interface 130. Device driver 290 assigns a logical device number to each disc changer device 120, to allow an external computer program or the user to address each disc changer device 120 individually. As a result, application program 210 is able pre-queue CDs in a second disc changer device 120 while a first disc changer device is playing music or accessing data in its drive.

Device driver 290 further allows application program 210 to request that a disc in a specific slot of disc changer device 120 be mounted in an available drive.

Once mounted, changer service 270 checks volume information stored on each disc and, if this information has not previously been recorded, updates the disc's directory tree or track list information in CD Directory database 255.

Therefore, application program 210 can generate a complete inventory of the discs loaded on disc changer device 120 at any time by sending a sequence of such requests to changer service 270.

Device driver 290 further supports carousel-type disc changer devices that allow the user to insert several CDs at once when a door of disc changer device 120 is open. Once the door is closed, changer service 270 compares the most recent slot list with a table read from a non-volatile memory of disc changer device 120 and reports changes in the status of the slot list to application program 210. Application program 210, in turn, can either report this information to the user through GUI 220 or automatically inventory any CDs that were added to disk changer device 120. Changer service 270 also detects which slots are empty when the door closed and removes any entries in the slot list for the empty slots. Whenever the door is closed, changer service 270 determines how to update the slot list using as shown in FIG. 3.

Figure 3:
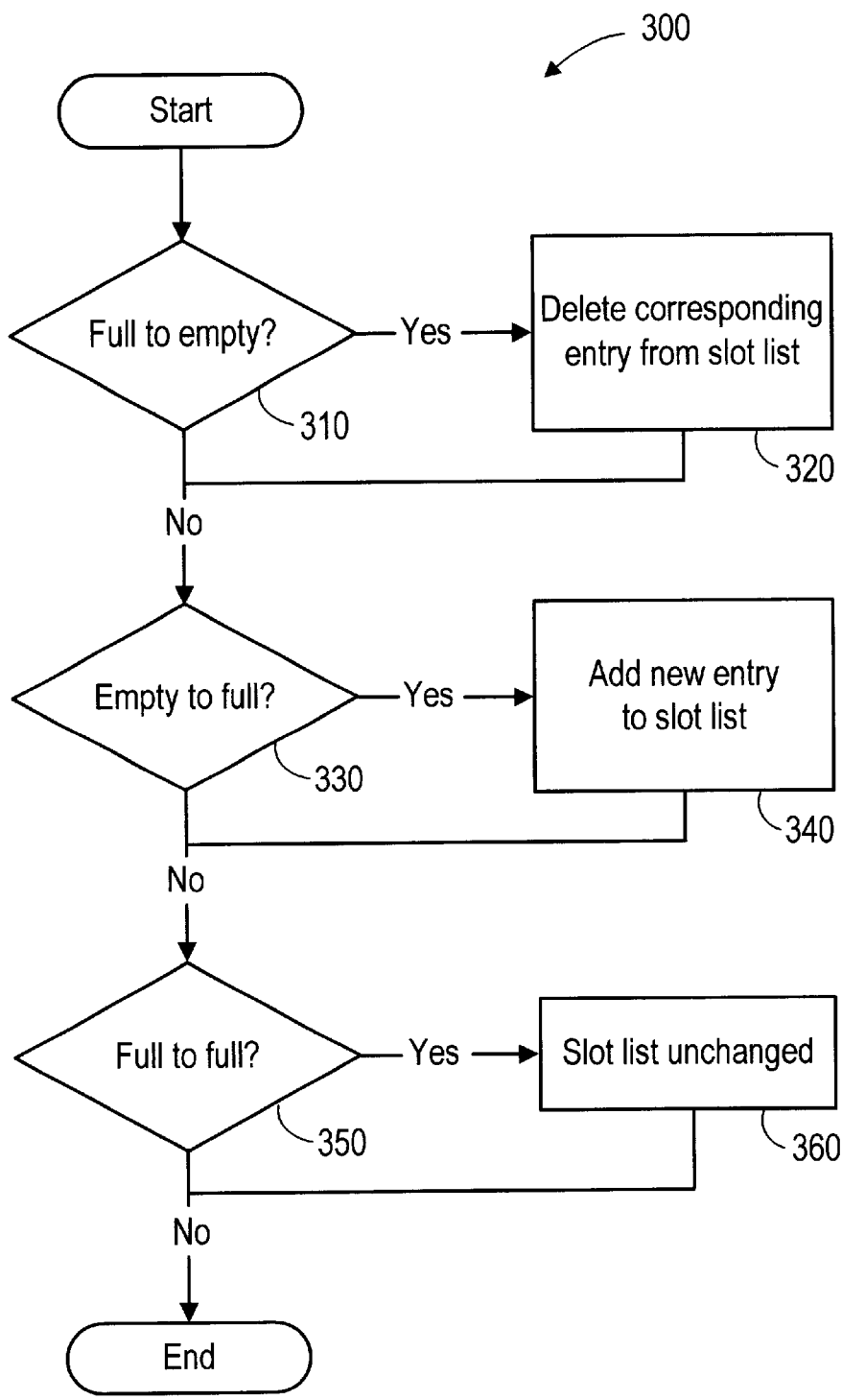
FIG. 3 is a flow diagram of a slot list update operation, in accordance to an embodiment of the invention.

FIG. 3 is a flow diagram of a slot list update operation 300. First, stage 310 determines whether a slot that was full prior to the door of disc changer device 120 being open is now empty, in which case operation 300 proceeds to stage 310. Otherwise, operation 300 proceeds to stage 320. In stage 310, the entry in the slot list corresponding to the empty slot is deleted from the slot list. Stage 320 then determines whether a slot that was empty prior to the door of disc changer device 120 being open is now full, in which case operation 300 proceeds to stage 330. Otherwise, operation 300 proceeds to stage 340. In stage 340, a new disc entry is added to the slot list. Finally, stage 350 determines whether a slot that war full prior to the door of disc changer device 120 being open is still full, in which case operation 300 proceeds to stage 360. Otherwise, operation 300 terminates. In stage 360, the slot list is left unchanged since the original disc is assumed not to have changed.

If a slot that was full was exchanged with a new disc while the door was open, this fact is not discovered until the disc is actually mounted in the drive, at the request of the user or of a software application that attempts to access a file on the original disc. This strategy minimizes the impact of delay that would otherwise occur if the assumption that the disc did not change was not made. Changer service 270 generates an error condition at run time when a disc exchange is detected and updates the slot list and cache entries, immediately after the error is detected. The application requesting the original disc receives an error condition, which normally results in a message being displayed to the user indicating that the old disc is no longer available.

Detailed operation of device driver 290, IOCTL interface 280 and changer service 270 is further described in Appendix A, which is herein incorporated by reference in its entirety.

GUI 220 of application program 210 allows the user to perform integrated CD title management, audio player, playlist management, bookmarks, and graphical browsing of content within a single application framework.

FIGS. 4A–4D illustrate different views of the user's collection of multimedia files and discs displayed by a graphical user interface (GUI) component 220 of application program 210 on a display screen of computer 110.

Figure 4A:
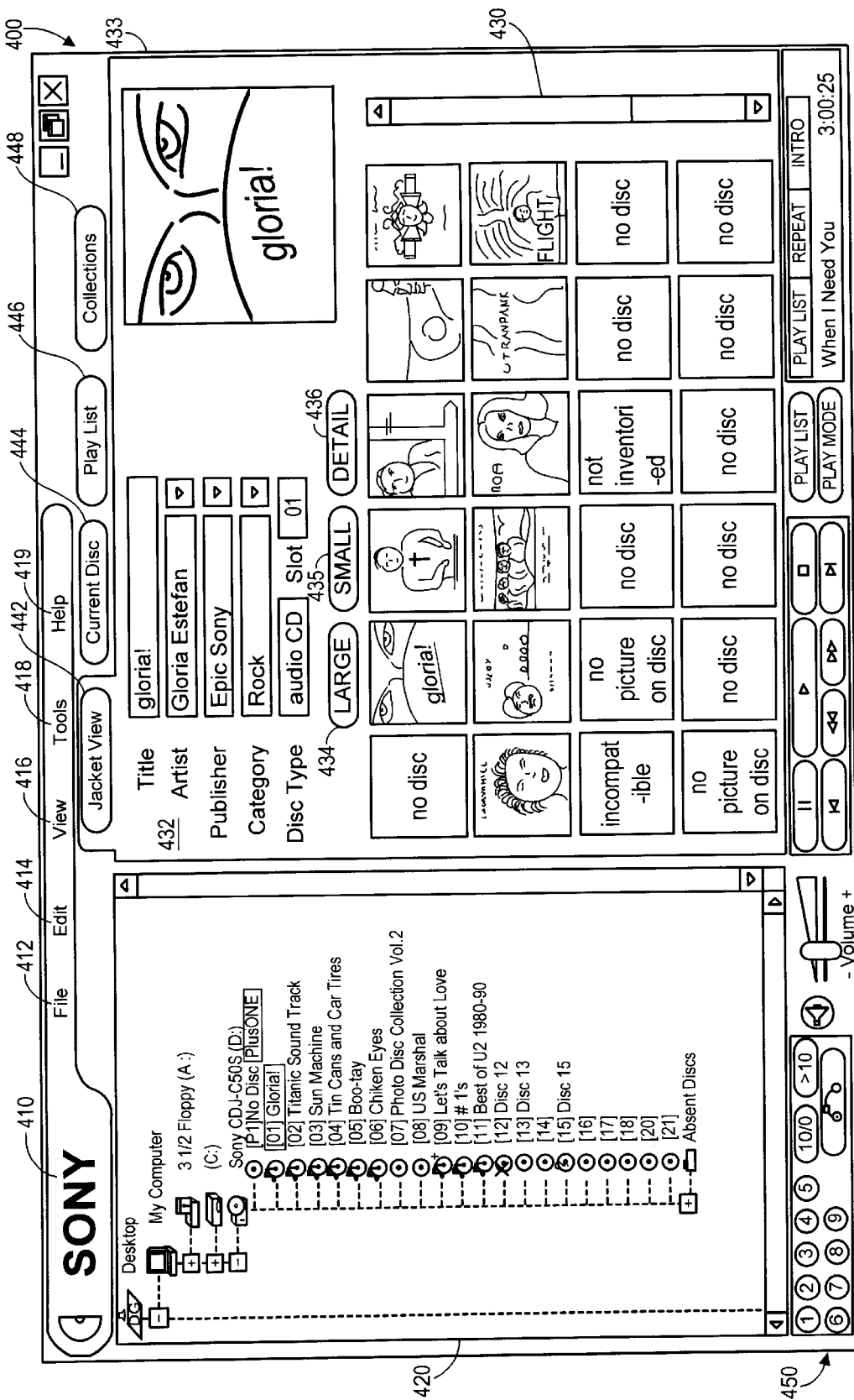
FIGS. 4A–4D show different views of a window displayed on a screen of the computer system of FIG. 1 by a computer program in accordance to an embodiment of the invention.
Figure 4B:
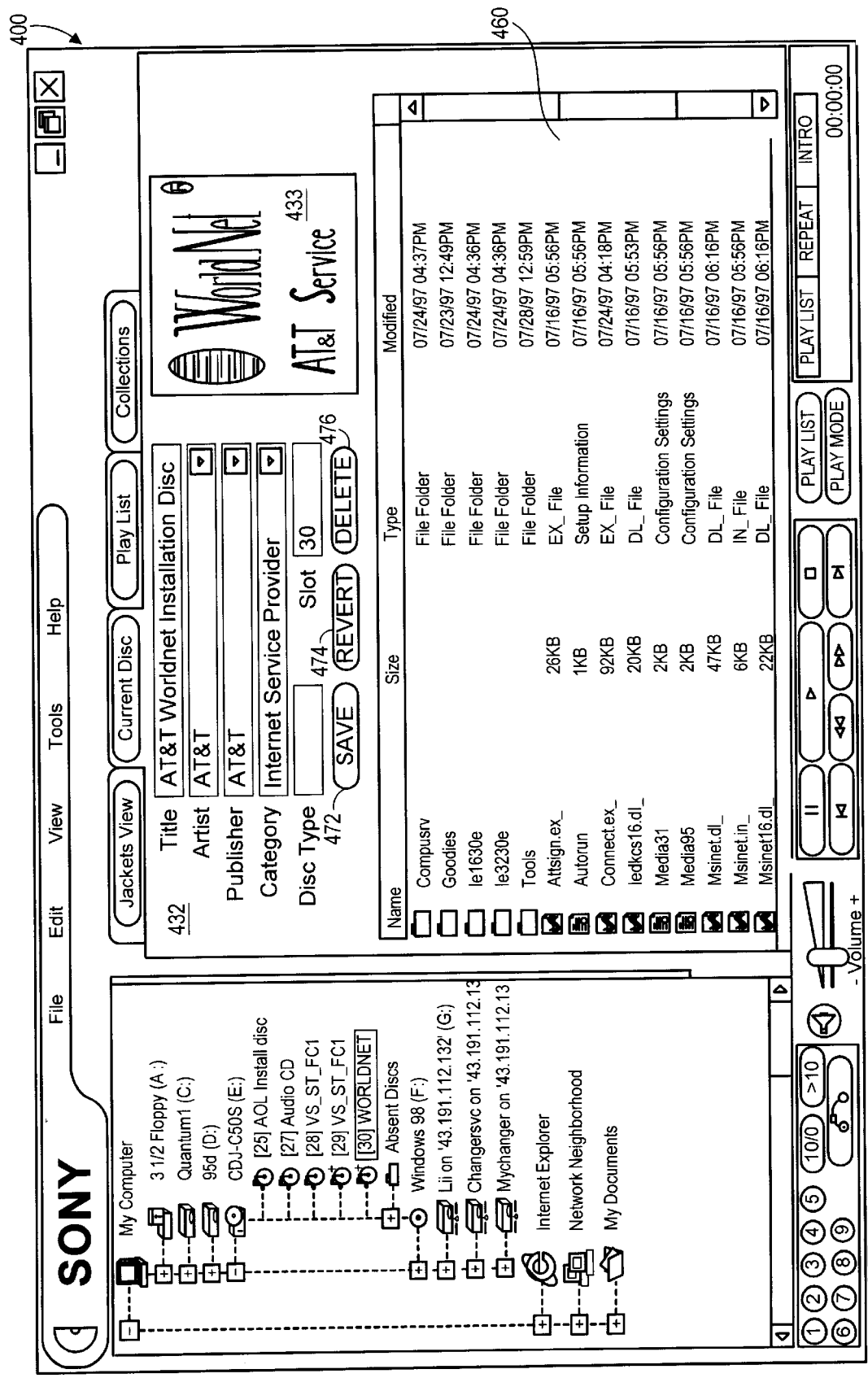

FIG. 4A illustrates a window 400 displayed by GUI 220 on a display screen of computer 110. Window 400 includes a menu bar 410, a directory pane 420, an information pane 430 and a built-in player 450.

Menu Bar 410 includes a file menu 412, an edit menu 414, a view menu 416, a tools menu 418 and a help menu 419. The user can control the display of discs in both directory pane 420 and in different sections of information pane 430 using commands provided in one of file menu 412, edit menu 414, view menu 416 and tools menu 418. Furthermore, the user can gain access to information about the operation of computer system 110 via commands provided in help menu 419.

The user can further cause the list of discs displayed in directory pane 420 and the jackets displayed in information pane 430 to be sorted by Title, Artist, Category, or Publisher by selecting appropriate commands from view menu 416.

The user can further limit the discs shown in directory pane 420 and information 430 to discs matching criteria selected by the user by selecting an appropriate command from view menu 416 and specifying Title, Artist, Category, or Publisher information to be used in the filtering process.

The user can search a specific disc in disc changer device 120, based on keyword match in Title, Artist, Category, Publisher, or Notes field by selecting an appropriate command from tools menu 418.

The user can also cause either a specific slot, a set of highlighted slots, or all slots in disc changer device 120 to be inventoried by selecting an appropriate command in view menu 416.

Directory pane 420, in turn, displays volume titles in a tree-view arrangement where nodes on the tree can be folded and unfolded by clicking on nodes of the tree. Visual indicators of whether a node is folded or unfolded are provided by a box containing either a "+" (to indicate folded nodes) or a "−" sign (to indicate unfolded nodes).

By controlling directory pane 420, the user can sort CDs by Slot Number, Title, Artist, Category, or Publisher, hide empty slots, mount a CD, view the content of a CD without mounting the CD using CD directory database 255, select a CD to build a playlist or collection, eject a CD or multiple CDs (by positioning the robotics and opening the door), insert a CD or multiple CDs into disc changer device 120 (by positioning the robotics and opening the door), viewing CD-Extra discs both by audio track list and by CD-ROM session directory tree, or view, edit, and delete absent discs that have been removed from disc changer device 120 but that have persistent entries in the CD Information Database 230.

Information pane 430 includes a tab bar 440. Tab bar 440, in turn, includes jacket view tab 442, current disc tab 444, playlist tab 446 and collections tab 448.

When jacket view tab 442 is selected (FIG. 4A), information pane 430 further includes a disc information area 432, a selected jacket icon 433, large view button 434, small view button 435, detail view button 436 and a plurality of disc jacket icons 438n (where n=a, b, c, etc.).

Each disc jacket icon 438*n* shows a thumbnail image of the jacket cover of a corresponding CD. The user can vary the format in which disk jacket icons 438*n* are displayed by pressing one of buttons 434, 435 or 436. When large view button 434 is selected, each disc jacket icon 438*n* occupies a larger portion of the screen than when small view button 435 is selected. In addition, when detail view button 436 is selected, detailed text view of CDs with information is displayed in columns about the CDs corresponding to disc jacket icons 438*n*.

As explained with respect to menu bar 410, disc jacket icons 438*n* can be sorted by title, artist, category, or publisher and the user can select CDs to mount and access (or play, in the case of CDDA discs) by double-clicking on a corresponding disc jacket icon 438*n*.

Furthermore, the user can cause disc information such as title, artist, category, publisher, disc type, or slot number to be displayed in disc information area 432 by single-clicking on a corresponding disc jacket icon 438*n*. When a CD information is displayed in disc information area 432, the corresponding disc jacket icons 438*n* is also displayed in selected jacket icon 433.

When current disc tab 444 is selected (FIG. 4B), information pane 430 includes a disc information area 432, a selected jacket icon 433, track list 460, save button 472, revert button 474 and delete button 476.

When current disc tab 444 is selected, the user can automatically enter disc information including title, artist, category, publisher, jacket cover image, or track titles retrieved from an Internet database. Alternatively, the user can manually enter such information by typing it into disc information area 432.

Furthermore, the user can define his/her own categories to classify discs in his/her collection by entering such information in a Category field of disc information area 432.

In some embodiments, a notes field could be added to disc information area 432 to allow the user to enter additional information about the selected CD. Such information could later be used to search the user's CD collection.

Track list 460, in turn, displays titles for each of the tracks in the selected CD when an audio CD is displayed or mounted. The user can thus select tracks to be played by built-in player 450 in single-disc mode.

Track list 460 is also used to display a detailed view of a directory of the current disc. Initially, the list shows the root directory of the disc. When a user double-clicks an icon in the directory, the contents of a corresponding directory are displayed in this area, allowing the user to navigate from the disc's directory tree.

When playlist tab 446 is selected (FIG. 4C), information pane 430 includes a playlist pane 470. Playlist pane 470, in turn, includes a track file list 460, a play list 475, a list name field 472, a save button 474, a save as button 476, a revert button 478 and a delete button 480.

When playlist tab 446 is selected, the user can create streaming multimedia playlists that include both CDDA and digital file content such as: CDDA audio tracks, digital audio files (wav, au, rp, midi, etc.), videoCD tracks and digital video clips (avi, mpg, mov, etc.).

Logical paths of tracks and CDs are stored in playlist entries using unique volume identifiers retrieved from the discs. Logical paths of tracks and CDs are resolved to slot numbers at runtime (when tracks are accessed for playback). Tracks or files can be added to a playlist by drag-and-drop operations from track file list 460 into playlist 475.

Tracks or files can also be transferred from one playlist to another using a clipboard. In some embodiments, playlist 475 can be converted into a floating playlist, allowing for drag-and-drop operations from a floating playlist to another playlist 475 (either floating or in information pane 430).

Figure 4C:
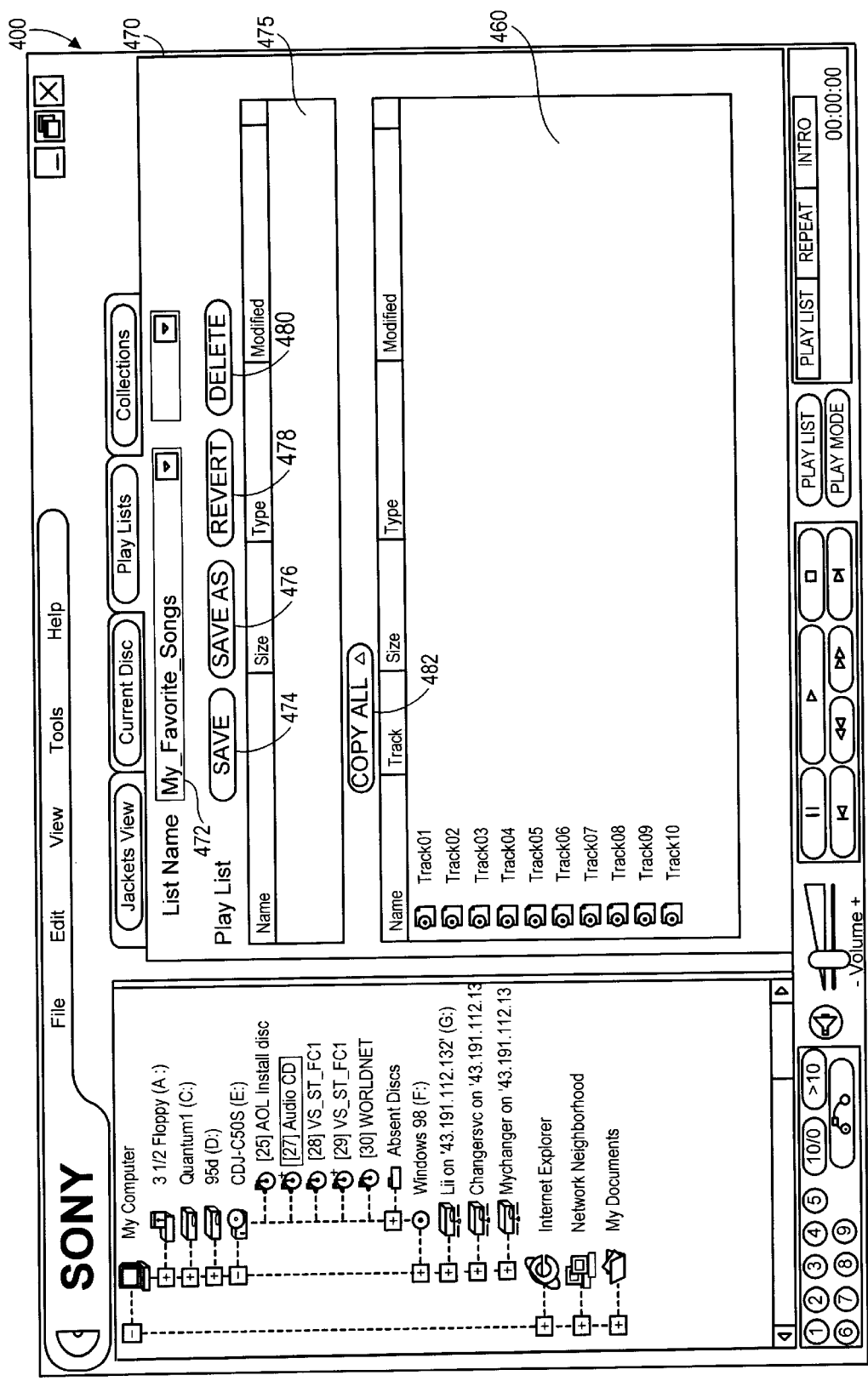
Figure 4D:
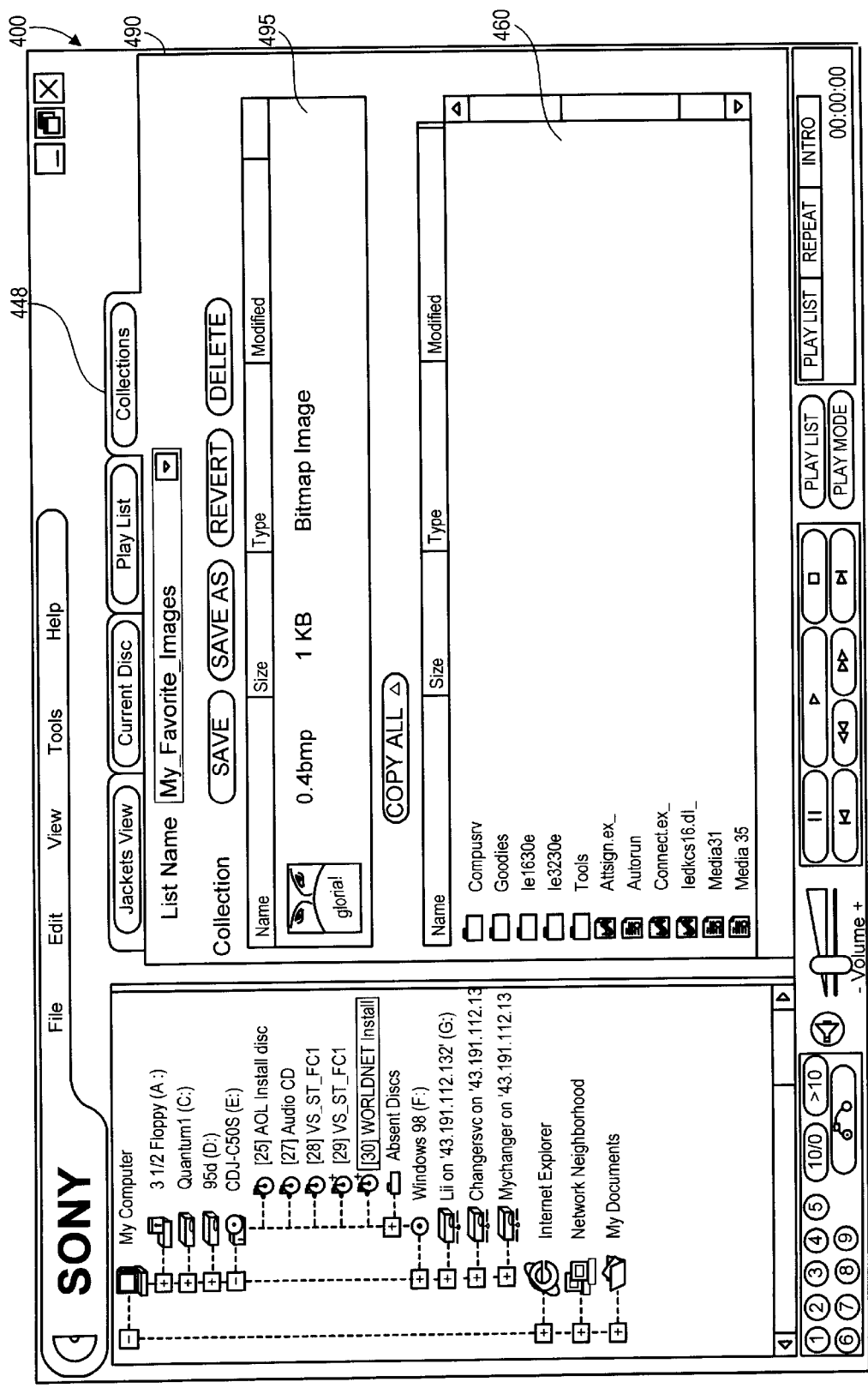

When collections tab 448 is selected (FIG. 4D), information pane 430 includes a collections pane 490 in place of playlist pane 470 of FIG. 4C. Collections pane 490, in turn, includes a collection 495 and a track file list 460. Collection 495 further includes thumbnail images of all images in a current directory on a CD or hard-disk drive. Predefined thumbnail icons are provided to represent audio files, video files, or non-multimedia files stored in collections. Logical paths for each file are stored in collection entries using unique volume identifiers retrieved from the discs.

In some embodiments, collection entries contain a notes field allowing the user to enter a brief number of keywords. Logical paths are resolved to slot numbers at runtime (when files pointed to by collection objects are retrieved).

The user can add files to a collection by performing a drag-and-drop operation of selected files from track file list 460 into collection 495. Furthermore, selected files can be transferred from one collection to another using a clipboard. In some embodiments, collection 495 can be converted into a floating collection to enable drag-and-drop operations to be performed from a floating collection to another collection 495 (either floating or in information pane 430). Furthermore, collection items can be located by searching within a single collection or across multiple collections for a keyword stored in the file name or the notes field of collection entries.

Built-in player 450 supports both single-disc play and playlists. In some embodiments, built-in player 450 can be switched to a floating player window which hides all information except for player controls.

Using built-in player 450, the user can play individual CDDA tracks on a mounted disc, an entire CDDA disc in original track order or random order, playlists composed of tracks from multiple CDDA discs and performing automatic media exchange like an old-style music jukebox, playlists composed of digital multimedia clips stored on different CD-ROMs or an hard-disk drive of computer 110, playlists composed of mixtures of CDDA tracks on CDDA discs and digital multimedia clips stored on CD-ROMs or an hard-disk drive of computer 110.

When each CD is mounted, a record is created in CD information database 230 that has a schema that includes the following fields: disc ID, disc type, title, artist, category, publisher, jacket cover image, track titles, artist web site, publisher web site and notes field. Track lists and corresponding lengths in seconds are also stored in CD information database 230.

The records stored in CD information database 230 are maintained persistently even if the disc is removed from disc changer device 120 or the disc is moved to a different slot of disc changer device 120. This process is sometimes referred to as "offline media management".

The relationship between a disc and its slot is dynamic so that a disc can be mounted without regard to its physical slot location when playlists or collections request tracks or files stored on the disc. Thus, records stored in CD information database 230 can be examined even if a disc is no longer in disc changer device 120. Furthermore, records stored in CD information database 230 can be edited or deleted at any time.

Playlist database 240 stores information associated with playlists. A playlist is a collection of tracks on CDDA discs or files stored on CDs or a hard-disk drive of computer 110. A playlist entry contains a path to a file on a logical volume designated by a hard-disk drive letter or a CD title. The relationship between a CD title and a slot of disc changer device 120 is dynamic. Therefore, a disc can be mounted without regard to a physical slot location when playlists or collections request tracks or files stored on the disc. Playlists can contain tracks or files on CDs that are no longer loaded on disc changer device 120. When these CDs are replaced at a later time, the playlist can be played without interruption.

The user can select whether to warn the user that discs referenced in the playlist are no longer loaded in disc changer device 120 or whether the corresponding entries in the playlist should be skipped during playback.

Built-in player 450 is used to play the entries in the playlist in sequence. The analog line-output of disc changer device 120 is connected to the line-input jack of a sound card of computer 110. This allows the same set of speakers connected to the line-output jack of the sound card to be used to hear both CDDA tracks from CDDA discs loaded on disc changer device 120 and digital music clips played from a hard-disk drive or internal CD-ROM drive of computer 110 or from CD-ROMs loaded on disc changer device 120.

When a playlist contains both CDDA tracks and digital music clips and the output of disc changer device 120 is connected to the input of a sound card of computer 110, playlist entries are played seamlessly regardless of whether they are CDDA tracks or digital music clips.

Playlists can be constructed using entries in music CDs that are no longer loaded in disc changer device 120, but whose information was stored in CD information database 230 at a previous time. These persistent entries contain the track lists and corresponding track times of the original music CDs. In the case that the track names were entered automatically from an Internet server or manually by the user, these names appear as well. Applications for offline track lists include allowing users to construct playlists using collections of CDs that they may not own, but plan to in the future, allowing professionals to construct playlists for playback on another computer system that containing the missing discs, allowing listeners, for instance in a restaurant or music store setting, to scan a list of all available music tracks and create a playlist which they would like to hear.

Collections database 250 stores information pertaining to user-defined collections. A collection is a set of objects that contain pointers to files stored on CDs loaded on disc changer device 120 or other storage devices of computer 110.

Collections serve two main purposes: to make it easy for users to remember where certain files are stored, as in a bookmark, and to allow the user to collect multimedia files into a set that can be accessed by presentation software such as Microsoft PowerPoint, Adobe Premier, or Macromedia Director. Each object contains a logical pointer to the path of the file.

In the case of files on CD-ROMs, the root path of the pointer contains the volume ID. This ID is resolved to a slot number in disc changer device 120 at runtime only when an item needs to be retrieved from the CD for display, playback or copy to the hard-disk drive of computer 110.

The files pointed to by objects in a collection can be dragged to the hard-disk drive by dragging individual files in an open collection or by clicking a button to force a "batch copy" of all the files in a collection to the hard-disk drive in a single procedure that requires no user intervention.

The Batch-copy function is an extremely efficient way to transfer multimedia assets from a collection of CDs to the hard-disk drive for incorporation into presentations, publications, advertising pieces, custom recordable CDs, or other distribution media used by professionals in many fields.

CD directory database 255 is managed by a process ChangerService that runs in the background. As each CD is mounted into the changer's drive, the CD volume ID is compared to entries in CD directory database 255. If the entry is found, the existing directory cache is used. Otherwise, the entire directory tree of the CD is read by changer service 270. The tree is recorded in a persistent database that is used to browse through the files and directories of the CD at later times without the need to remount the CD in a drive of disc changer device 120. This allows browsing to occur across the entire CD collection without interrupting music playback or access to CD-ROM files in the currently-mounted disc. Music CD track lists and track lengths are also stored in the cache. The cache reading mechanism and appearance of the CDROM titles in the changer are currently accessed by the GUI 220 through COM interface 260.

In addition to GUI 220, the cache reading mechanism and appearance of the CDROM titles in the changer is available to the operating system kernel's I/O subsystem through a name space extension so that the titles and directory trees can be browsed in the default file manager (Windows Explorer, in the case of Microsoft Windows 95, 98 and NT) without any additional software. The name space or "shell" extension provides additional functionality beyond that provided by the default file manager.

To guarantee consistency, when a CD-ROM is removed from disc changer device 120, the corresponding directory tree is deleted from the CD directory database 255. This forces computer program 200 to rebuild the tree the next time the CD-ROM is inserted and mounted in the drive. This process ensures that the contents of the CD-ROM are up-to-date as long as the CD-ROM remains in disc changer device 120.

Detailed operation of GUI 220 is further described in Appendix B, which is herein incorporated by reference in its entirety.

Figure 5A:
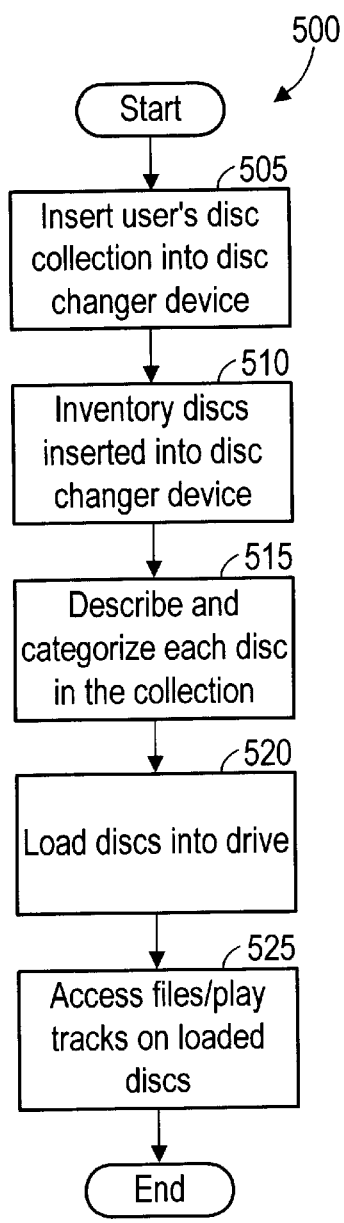
FIG. 5A is a flow diagram of a disc collection management operation in accordance to an embodiment of the invention.

FIG. 5A is a flow diagram of a disc collection management operation 500, in accordance to an embodiment of the invention.

First, in stage 505, the user's collection of discs is loaded into disc changer device 120. The user's disc collection may include both audio CDs and CD-ROMs. Computer program 200, in turn, detects insertion of the discs into disc changer device 120 and automatically inventories the contents of each inserted disc in stage 510. The user, describes and categorizes entries in the inventoried disc in stage 515 using GUI 220. The user, still using GUI 220, then causes one or more discs to be loaded into a drive of disc changer device 120 in stage 520. Finally, the user accesses files and/or plays audio or video tracks stored on the loaded discs via built-in player 450.

Figure 5B:
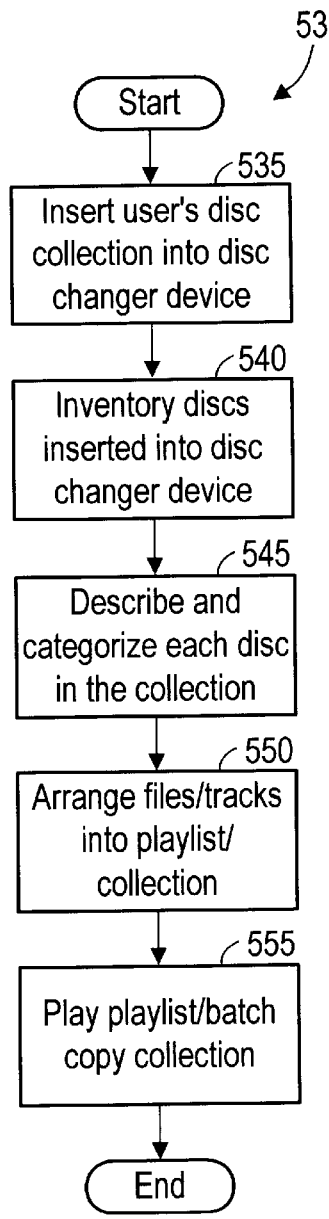
FIG. 5B is a flow diagram of a playlist management operation in accordance to an embodiment of the invention.

FIG. 5B is a flow diagram of a playlist management operation 530, in accordance to an embodiment of the invention.

Stages 535, 540 and 545 of operation 530 are analogous to stages 505, 515 and 520 of operation 500. The user then arranges files and or tracks stored on the inventoried discs in a playlist or collection using GUI 220 in stage 550. Finally, in stage 555, the user uses the collection to batch copy files stored on the inventoried discs using GUI 220 or starts built-in player 450 to play the list of tracks in the playlist.

Discs containing the tracks or lists in the playlist or collection are automatically loaded during this operation.

Figure 5C:
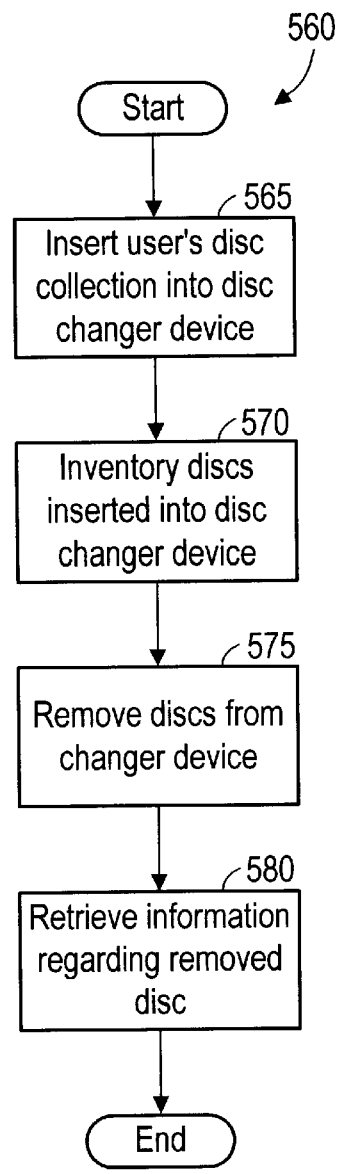
FIG. 5C is a flow diagram of a removed disc management operation in accordance to an embodiment of the invention.

FIG. 5C is a flow diagram of a removed disc management operation 560, in accordance to an embodiment of the invention.

Stages 565, 570 and 575 of operation 560 are analogous to stages 505, 515 and 520 of operation 500. The user then removes one or more discs from disc changer device 120 in stage 575. Finally, in stage 580, the user retrieves information about one of the removed discs.

The present disclosure describes a tool for consumers, music enthusiasts, and professionals to manage music CDs and CD-ROMs typically used in a home PC or standalone workstation environment. Consumers would typically manage music CDs, game CD-ROMs and some application and clip-art CD-ROMs. Music enthusiasts, such as consumers wishing to have more automated control over their music CD collection and semi-professional recording artists would store not-only published music CDs, but CDR and CDRW discs containing tracks recorded by the user or associates of the user. Professionals, such as graphic artists, attorneys, accountants, and physicians would manage their reference CD-ROMs containing digital photos, legal documents, tax codes, pharmaceutical reference CDs and medical journal reference CDs using this invention.

Alternate uses include museums, retail music and video stores, and shopping mall kiosks. Museums may have collections of CD-ROMs or DVD-ROMs containing high-resolution digitized photographs of their holdings. These high-resolution images are sometimes so large that a single image can consume the capacity of one CD-ROM. Many art museums are amassing large collections of CD-ROMs containing not-only their own holdings, but other collections as well. A computer system in accordance to an embodiment of the invention, could provide a convenient method of cataloging and searching for images of artworks in a museum environment.

Retail music and video stores could easily implement a listening or viewing station, in accordance to the principles of the invention, that allows customers to browse through a store's inventory of CDs and preview a CD's content before purchasing the software. U.S. Pat. No. 5,740,134, "Musical CD creation unit" by Peterson on Apr. 14, 1998, describes a device that allows customers to create CD-Recordable discs with their selected tracks for purchase in the store has been described in. The features described herein offer alternative and enhanced usability for such a device.

Shopping mall kiosks can include a computer system, in accordance to an embodiment of the invention, that allows customers to search for information graphically and see images representing views inside of stores and individual products. Kiosks could also contain databases of products for sale outside of the physical establishment, such as homes. The user would be able to create collections of images which were viewed during the session and print out a listing of these images on paper or a CD-Recordable disc which would be dispensed by the kiosk for some fee.

Embodiments described above illustrate but do not limit the invention. In particular, the invention is not limited to any particular type of storage medium. In addition, the invention is not limited to any particular hardware or software implementation. Those skilled in the art realize that alternative hardware and software arrangements can be employed in lieu of the ones described herein in accordance to the principles of the present invention. Other embodiments and variations are within the scope of the invention, as defined by the following claims.

We claim:

1. A computer system comprising:

a stand-alone computer;

a disc changer device connected to the stand-alone computer; and a user's collection of discs including both audio and CD-ROM discs, at least a portion of which is loaded in the disc changer device; and a computer program executed by the stand-alone computer, the computer program comprising instructions for:

detecting insertion of one or more discs in the user's collection into the disc changer device;

automatically inventorying the detected discs device to create a database of information identifying each disc inserted in the disc changer device;

describing and categorizing each disc in the user's collection;

loading one or more discs in a drive of the disc changer device; and accessing files or playing audio or video tracks stored on the loaded discs.

2. The computer system of claim 1, wherein the information identifying each disc includes a title, a directory name and a file name.

3. The computer system claim 1, wherein the computer program further comprises instructions for:

detecting a user's selection of one of a predefined set of sorting criteria; and sorting the loaded discs based on the selected criterion.

4. The computer system of claim 1, wherein the computer program further comprises instructions for displaying a set of discs and one or more multimedia files on the disc changer device either textually or graphically.

5. The computer system of claim 1, wherein the computer program further comprises instructions for viewing multimedia discs as both a set of audio tracks and a directory tree of files.

6. The computer system of claim 5, wherein the multimedia discs are CD-Extra discs.

7. A computer system comprising:

a stand-alone computer;

a disc changer device connected to the stand-alone computer; and a user's collection of discs including both audio and CD-ROM discs, at least a portion of which is loaded in the disc changer device; and a computer program executed by the stand-alone computer, the computer program comprising instructions for:

detecting insertion of one or more discs in the user's collection into the disc changer device;

automatically inventorying the detected discs to create a database of information identifying each disc in the user's collection;

describing and categorizing each disc in the user's collection;

arranging one or more files into a file collection; and batch copying the files in the file collection using the file collection as a reference for locating files on one or more discs and automatically loading the discs on which the files are located into the disc changer device.

8. The computer system of claim 7, wherein the computer program further comprises instructions for using the file collection as a reference to incorporate files into a multimedia presentation.

9. A computer system comprising:

a stand-alone computer;

a disc changer device connected to the stand-alone computer; and a user's collection of discs including both audio and CD-ROM discs, at least a portion of which is loaded in the disc changer device; and a computer program executed by the stand-alone computer, the computer program comprising instructions for:

detecting insertion of one or more discs in the user's collection into the disc changer device;

automatically inventorying the discs inserted into the disc changer device to create a database of information identifying each disc in the user's collection;

describing and categorizing each disc in the user's collection;

arranging one or more tracks or multimedia files stored in the user's collection into a playlist; and playing the tracks or multimedia files in the playlist while automatically loading the discs on which the tracks or multimedia files are located into the disc changer device.

10. A computer system comprising:

a stand-alone computer;

a disc changer device connected to the stand-alone computer; and a user's collection of discs including both audio and CD-ROM discs, at least a portion of which is loaded in the disc changer device; and a computer program executed by the stand-alone computer, the computer program comprising instructions for:

detecting insertion of one or more discs in the user's collection into the disc changer device;

automatically inventorying the discs inserted into the disc changer device to create a database of the titles, directories and file names on all discs inserted in the disc changer device;

detecting that one or more discs are removed from the disc changer device; and retrieving information about at least one of the discs removed from the disc changer device from the database.

11. A method for managing a user's collection of discs using a stand-alone computer system, the method comprising:

inserting the user's collection of discs into a disc changer device, wherein the user's collection of discs includes both audio and CD-ROM discs;

automatically inventorying the discs inserted in the disc changer device to create a database of information identifying each disc inserted in the disc changer device;

describing and categorizing each disc in the user's collection;

loading one or more of the discs in a drive of the disc changer device; and accessing files or playing audio or video tracks stored on the loaded discs.

12. The method of claim 11, wherein the information identifying each disc includes a title, a directory name and a file name.

13. The method of claim 11, further comprising:

selecting one of a predefined set of sorting criteria; and sorting the loaded discs based on the selected sorting criterion.

14. The method of claim 11, further comprising displaying a set of discs and one or more multimedia files on the disc changer device either textually or graphically.

15. The method of claim 11, further comprising viewing multimedia discs as both a set of audio tracks and a directory tree of files.

16. The method of claim 15, wherein the multimedia discs are CD-Extra discs.

17. A method for managing a user's collection of discs using a stand-alone computer system, the method comprising:

inserting the user's collection of discs into a disc changer device, wherein the user's collection of discs includes both audio and CD-ROM discs;

automatically inventorying the detected discs to create a database of information identifying each disc in the user's collection;

describing and categorizing each disc in the user's collection;

arranging one or more files into a file collection; and batch copying the files in the file collection using the file collection as a reference for locating files on one or more discs and automatically loading the discs on which the files are located into the disc changer device.

18. The method of claim 17, further comprising using the collection of files as a reference to incorporate files into a multimedia presentation.

19. A method for managing a user's collection of discs using a stand-alone computer system, the method comprising:

inserting the user's collection of discs into a disc changer device, wherein the user's collection of discs includes both audio and CD-ROM discs;

automatically inventorying the discs inserted into the disc changer device to create a database of information identifying each disc in the user's collection;

describing and categorizing each disc in the user's collection;

arranging one or more tracks or multimedia files stored in the user's collection into a playlist; and playing the tracks or multimedia files in the playlist while automatically loading the discs on which the tracks or multimedia files are located into the disc changer device.

20. A method for managing a user's collection of discs using a stand-alone computer system, the method comprising:

inserting the user's collection of discs into a disc changer device;

automatically inventorying the discs inserted into the disc changer device to create a database of the titles, directories and file names on all discs inserted in the disc changer device;

removing one or more discs from the disc changer device; and the user retrieving information about at least one of the discs removed from the disc changer device from the database.

21. A computer-readable storage medium comprising computer instructions for:

detecting insertion of one or more discs of a user's collection of discs, the user's collection of discs including both audio and CD-ROM discs, into a disc changer device;

automatically inventorying a plurality of discs inserted in the disc changer device connected to a stand-alone computer to create a database of information identifying each disc inserted in the discs changer device;

describing and categorizing each disc in the user's collection;

loading one or more of the plurality of discs in a drive of the disc changer device; and accessing files or playing audio or video tracks stored on the loaded discs.

22. A computer-readable storage medium comprising computer instructions for:

detecting insertion of one or more discs of a user's collection of discs, the user's collection of discs including both audio and CD-ROM discs, into a disc changer device;

automatically inventorying a plurality of discs inserted in the disc changer device connected to a stand-alone computer to create a database of information identifying each disc inserted in the disc changer device;

describing and categorizing each disc in the user's collection;

arranging one or more files into a file collection; and batch copying the files in the file collection using the file collection as a reference for locating files on one or more discs and automatically loading the discs on which the files are located into the disc changer device.

23. A computer-readable storage medium comprising computer instructions for:

detecting insertion of one or more discs of a user's collection of discs, the user's collection of discs including both audio and CD-ROM discs, into a disc changer device;

automatically inventorying a plurality of discs inserted in the disc changer device connected to a stand-alone computer to create a database of information identifying each disc inserted in the disc changer device;

describing and categorizing each disc in the user's collection;

arranging one or more tracks or multimedia files stored in the user's collection into a playlist; and playing the tracks or multimedia files in the playlist while automatically loading the corresponding discs into the disc changer device.

24. A computer-readable storage medium comprising computer instructions for:

detecting insertion of one or more discs of a user's collection of discs, the user's collection of discs including both audio and CD-ROM discs, into a disc changer device;

automatically inventorying a plurality of discs inserted in the disc changer device connected to a stand-alone computer to create a database of information identifying each disc inserted in the disc changer device;

detecting that one or more discs are removed from the disc changer device; and retrieving information about at least one of the discs removed from the disc changer device from the database.

* * * * *